Nov. 13, 1962 G. SUGA 3,063,149
HANDPIECE DRILLING GUIDE
Filed Sept. 16, 1960 2 Sheets-Sheet 1
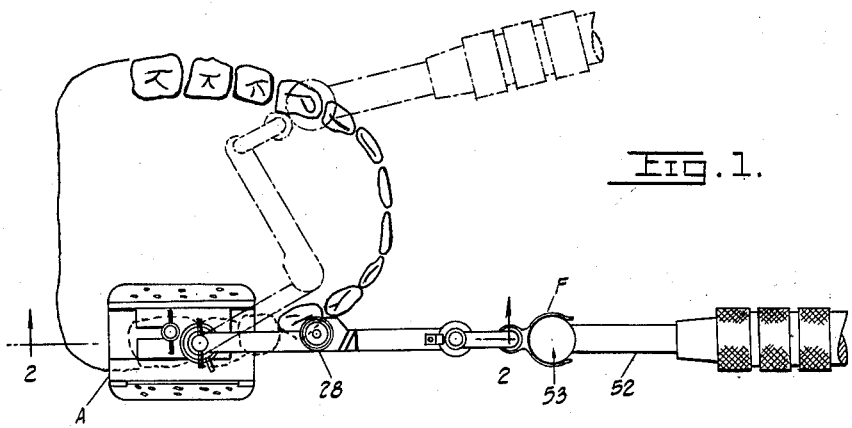
Fig.1.
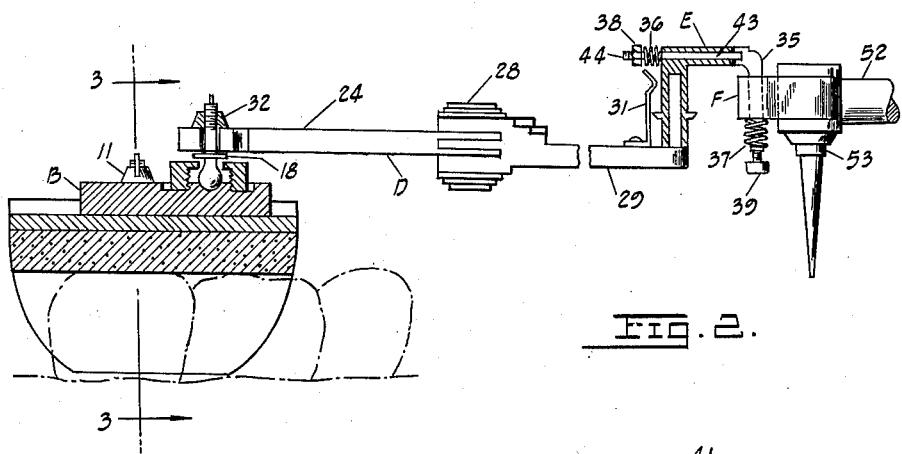
Fig.2.
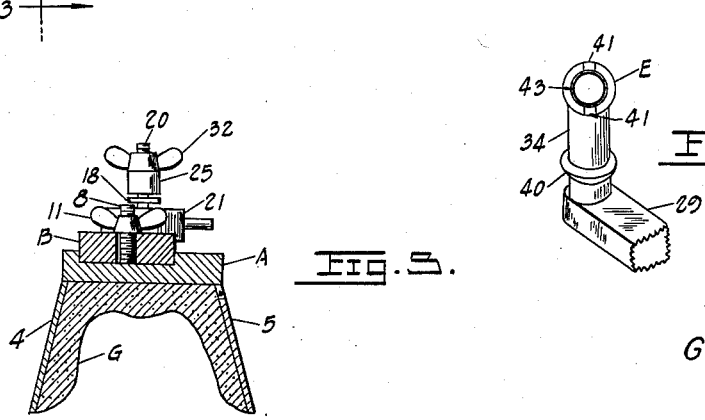
Fig.3.
Fig.4.
INVENTOR
Goro Suga
BY
ATTORNEY

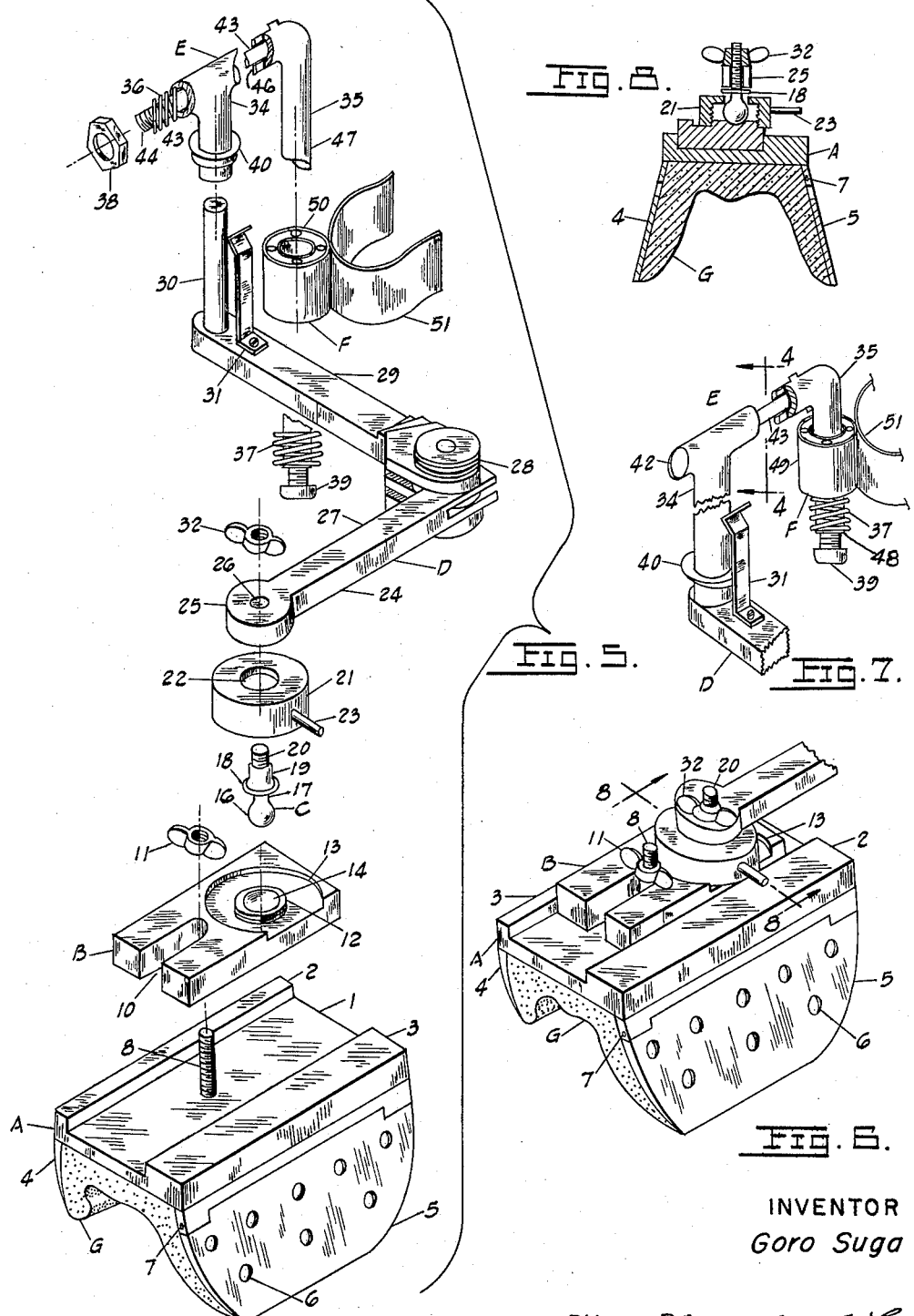

United States Patent Office 3,063,149
Patented Nov. 13, 1962

3,063,149
HANDPIECE DRILLING GUIDE
Goro Suga, 45129 Popoki St., Kaneohe, Hawaii
Filed Sept. 16, 1960, Ser. No. 56,507
10 Claims. (Cl. 32—67)

The present invention relates to a handpiece drilling guide or teeth cutting guide for use in securing parallelism in the cavity preparation of one or more teeth with precision and ease of strain rather than by present known methods of cutting by eyesight or freehand or even under splashing water.

The handpiece drilling guides that are presently available are either bulky, cumbersome, inaccurate, or not practical to use. The present invention is designed to eliminate all of the above cited disadvantages of handpiece drilling guides that are presently available and provide an easy way to secure parallelism in the cavity preparation of one or more teeth.

An object of this invention is to provide a handpiece drilling guide for gold inlay and bridge preparations.

Another object of this invention is to provide a device that will aid a dental operator in securing parallelism in the cavity preparation of one or more teeth with precision and ease.

A further object of this invention is to provide a device which will prevent overtapering of teeth and thus prevent bridge failures or gold inlay failures.

Still another object of the present invention is to provide a handpiece drilling guide whenever it is desired to drill the walls of teeth at the same taper.

Yet another object of this invention is to provide a device which will enable a dental operator to cut from any one side, the anterior segment of the dental arch (eye tooth to eye tooth) as well as the opposite posterior segment (bicuspid and molar area).

A further object of this invention is to provide a device which will enable a dentist to cut retention grooves in the teeth which will be parallel and tilted outwardly according to the long axis of the crown of the teeth.

A still further object of this invention is to provide a device which will enable a dentist to cut all walls (vertical and lateral) by merely guiding an arm that is attached to an Airotor dental drill.

Yet another object of this invention is to provide a device which might be partially assembled when the device is in the process of being secured to the teeth.

Yet another object of this invention is to provide a device which when secured in a patient's mouth might be partially disassembled to allow the dentist to do finishing and touching-up of the teeth and then assembled to do any further cutting of the teeth as may be desired by the dentist.

A still further object of this invention is to provide a device which when secured in a patient's mouth might be quickly partially disassembled to allow the patient to rest a while.

Still another object of this invention is to provide a device which will allow the easy insertion of an Airotor dental drill in a patient's mouth for drilling manipulations because the device has a provision whereby the Airotor dental drill may be rotated about a substantially horizontal axis and thus the Airotor dental drill need not be always in a truly vertical position.

Yet another object of this invention is to provide a device which will allow an Airotor dental drill to move up and down in a patient's mouth and thus give a dentist much needed leeway in drilling that is required due to the particular configuration of the patient's mouth or teeth.

A still further object of this invention is to provide a handpiece drilling guide which allows its arm to be easily and quickly set at a desired vertical angle by merely tilting the guide about a knuckle joint.

A still further object of this invention is to provide a handpiece drill guide of small dimensions so that it not inconvenience a patient when it is secured to his teeth.

Other objects, features and advantages of the present invention will be readily apparent from the following detailed description taken in connection with the accompanying drawings, in which:

FIGURE 1 is a top view of a preferred embodiment of the handpiece drilling guide when it is secured to the teeth of a patient. The dotted lines illustrate the manner in which the said guide operates to secure parallelism in the cavity preparation of teeth.

FIGURE 2 is an enlarged sectional view taken substantially on line 2—2 of FIGURE 1 and looking in the direction of the arrows.

FIGURE 3 is an enlarged sectional view taken substantially on line 3—3 of FIGURE 2 and looking in the direction of the arrows.

FIGURE 4 is a sectional view taken substantially on line 4—4 of FIGURE 7 and looking in the direction of the arrows.

FIGURE 5 is an exploded view of the preferred embodiment of the handpiece drilling guide, showing the relation of the various parts.

FIGURES 6 and 7 are fragmentary isometric views of different portions of the handpiece drilling guide.

FIGURE 8 is an enlarged sectional view taken substantially on line 8—8 of FIGURE 6 and looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings wherein like reference numerals refer to like and corresponding parts throughout the several views, the preferred embodiment of the invention disclosed in FIGURES 1 to 8 inclusive comprising a placement piece A, a block B, a rod C having a bulb-shaped knuckle at one end thereof, an arm D, a connector piece E, and a drill connector piece F.

The placement piece A includes a channel shaped piece (1, 2, 3) with flaring sides (4, 5) and an externally threaded shaft 8. The channel shaped piece consists of a base 1 and integral legs or sides 2 and 3. The said sides 2 and 3 are of different widths for a purpose to be explained later. The flaring sides 4 and 5 extend downwardly from the bottom of the base 1 and have a series of holes 6 therethrough. In addition, the flaring side 5 is hinged as at 7 to a projection on the bottom of base 1 for a purpose to be explained later. The externally threaded shaft 8 projects upwardly from the base 1 and is situated mid-way between the opposite faces of the sides 2 and 3.

The block B has a U-shaped slot 10 in one end which encircles the shaft 8; and is secured to the base 1 of the placement piece A between sides 2 and 3 by a wing nut 11 that is threadedly engaged to the shaft 8, and by opposite faces of the sides 2 and 3. The block B has an externally threaded stem 12 near its other end which projects upwardly from a substantially circular groove portion 13 formed in the upper face of the block. The stem 12 has a segmental spherical recess in its upper end to provide a socket 14 for the bulb-shaped lower end of rod C.

The rod C includes a bulb or knuckle 16 at its lower end, a small shaft portion 17, a circular shoulder 18, an enlarged diameter shaft portion 19, and an externally threaded shaft portion 20 at its upper end. It is secured to the block B by means of an internally threaded collar 21 which has a small hole 22 in its center that allows all of the rod C except the bulb 16 to pass through, and which has a turning handle portion 23. The collar may be knurled in lieu of the turning handle portion 23. The collar 21 is threadedly secured to stem 12 to secure the bulb-shaped lower end of rod C to block B.

The arm D includes a first arm portion 24, a hinged joint 28, a second arm portion 29, a spindle portion 30, and a keeper portion 31. The first arm portion 24 includes an enlarged circular end portion 25 having a circular hole 26 in its center through which the shaft portion 19 and the externally threaded portion 20 of the rod C passes, and a narrow portion 27, the end of which is connected by the hinged joint 28 to one end of the second arm portion 29. The second arm portion 29 has the spindle portion 30 secured to its other end and the keeper portion 31 between its ends and situated close to the spindle portion 30. The arm D is secured to the enlarged diameter shaft portion 19 of the rod C by mounting the apertured end 25 of arm portion 24 over the rod so that end 25 rests on the circular shoulder 18 and is held thereon by a wing nut 32 which is threaded onto the externally threaded upper end 20 of said rod C.

The connector piece E includes an angular sleeve 34, an angular shaft 35, two relatively weak compression springs 36 and 37, a nut 38, and a screw 39. The angular sleeve 34 is L shaped, and has a tubular leg which is loosely positioned over spindle 30 and which has a circular shoulder 40 adjacent one end thereof which cooperates with the keeper portion 31 of the arm D to prevent the connector piece E from being accidentally dislodged from the spindle portion 30. The other leg of sleeve 34 has an axial bore or hole 42 therethrough, and in the end thereof remote from spindle 30 has two notches 41 (FIG. 4) which are 180° apart. The angular shaft 35 also is L shaped and has a first leg 43 which passes through said hole 42 in sleeve 34. A portion 44 at one end of the leg 43 extends from the end of hole 42 remote from notches 41 and is externally threaded. The relatively weak compression spring 36 encircles the said leg portion 44, and the nut 38 is threaded on the latter to secure the angular shaft 35 to the angular sleeve 34. A collar 45 formed on shaft 35 at the opposite end of leg 43 has two prongs 46 at one end thereof that fit into the two notches 41, in sleeve 34. The other leg 47 of shaft 35 which has an internally threaded bore 48 in its end remote from leg 43. The relatively weak compression spring 37 encircles the leg 47, and is prevented from sliding off the lower end of leg 47 by the screw 39 which is threadedly engaged to the internally threaded portion 48 of leg 47 to secure the drill connector piece F to the connector piece E.

The drill connector piece F includes a sleeve portion 49 housing ball bearings 50 which encircle the leg 47 of the angular shaft 35 above the upper end of spring 37. A C shaped spring clip portion 51 which is secured to the exterior of sleeve 49 is adapted to hold the hand piece head 53 of a drill 52. Sleeve 49 rests resiliently on the upper end of spring 37, and is axially and angularly movable on leg 47.

The handpiece drilling guide is secured to the teeth (the bicuspid and molar) of a patient by means of a fast setting dental plaster G that sets in approximately two or three minutes. It may be secured to either the lower dental arch or the upper dental arch depending on the location of the teeth to be drilled. The series of holes 6 in the downwardly flaring sides 4 and 5 of the placement piece A assure good retention of the device to the said dental plaster.

The operation of the preferred embodiment of the handpiece drilling guide is as follows: The dental plaster G is first applied to the bottom of base 1 and the confronting inner surfaces of the flaring sides 4 and 5 of placement piece A. The placement piece A is then impressed on the bicuspids and molars of the patient to which the device is to be secured and the dental plaster is allowed to set. When the dental plaster has set, other parts of the handpiece drilling guide are assembled onto the placement piece A. Then the hand piece head 53 of a drill 52 is secured within the clip portion 51 of the drill connector piece F. The guide is now ready to be used by a dentist to drill the anterior segment of the dental arch (eyetooth to eyetooth) as well as the opposite posterior segment (bicuspid and molar area).

If the dentist desires to allow the patent to rest a while or if he desires to do finishing and touching-up of the teeth drilled, he will disassemble the block B and the rest of the guide from placement piece A by loosening wing nut 11 and taking the block B from placement piece A. In this connection it is to be noted that the device is not designed to satisfactorily drill the non critical sloping walls near the tip of the cusps of the teeth. These areas regardless of how they are drilled have no bearing on the insertion path and must be reduced by free hand. The block B and the rest of the guide are thereafter assembled onto the placement piece A by sliding the block B between the oppositely facing surfaces of sides 2 and 3 until the U-shaped slot 10 encircles the shaft 8, and then by threadedly engaging the wing nut 11 to the shaft 8 until the block B is secured to placement piece A, whenever the dentist deems it desirable to do so for any further drilling or cutting of the teeth as may be desired by the dentist.

Since the teeth of a human being are not normally straight vertically and the retention grooves must be cut or drilled according to how the teeth are shaped, the arm D is tilted according to the long axis of the crowns of the anterior teeth prior to cutting or drilling thereof by tilting the rod C about its lower, bulb-shaped end to the angle desired. The bulb 16, the socket 14, the space between the circular shoulder 18 and the top of collar 21 (see FIG. 8), and hole 22 allow the rod C to tilt a slight amount for this specific purpose.

The device is removed from the mouth by disassembling the block B and the rest of the guide from placement piece A by loosening wing nut 11 and taking the block B from the placement piece A. The placement piece A is then removed from the dental plaster G by separating the flaring side 5 from the dental plaster G. This separations is facilitated by the fact that the flaring side 5 is hinged at 7. After flaring side 5 is separated from the dental plaster G the remainder of the placement piece A is separated from dental plaster G. The dental plaster G is then chipped off the teeth.

The device may be made of hard steel, preferably stainless steel, although any other suitable material may be used. The sides 2 and 3 are made of different widths, with side 2 being of greater width than side 3 so that the rest of the handpiece drilling guide when assembled onto the placement piece A is off center of the teeth that the placement piece A is secured to so as to allow the arm D to be of a shorter length than would be the case if the rest of the handpiece drilling guide were not off-centered of said teeth. The shortening of the arm D enables the guide to be more effectively used in a patient's mouth.

The grooved-out portion 13 is for the purpose of lowering the height of the device. It is well-known in the dental art that the height of a device to be used in a patient's mouth is critical because of the unpleasantness which might be caused said patient if he were to open his mouth too wide for a length of time.

The large shaft portion 19 is of a length that is slightly greater than the thickness of the circular end portion 25 so that when arm D is secured to the rod C there will be a snug fit. The enlarged circular end portion 25 is seated between the circular shoulder 18 and the wing nut 32 or other type of nut so that there will be no play of the arm D.

It is preferred that angular sleeve 34 and angular shaft 35 be bent at right angles. However, the shape of the connector piece E may be varied according to the use it is to be put to, so long as its vertical portions, the leg of sleeve 34 mounted on spindle 30, and leg 47 of shaft 35, are parallel. For example, it may be made so that the angular sleeve 34 is bent at an obtuse angle while the angular shaft 35 is bent at an acute angle whenever it is desired to operate the device further up in a patient's mouth.

The purpose of spring 36 is to allow a little play by angular shaft 35 so that prongs 46 may be disengaged from the notches 41 and thus allow the angular shaft 35 to rotate about a substantially horizontal axis for easy insertion and manipulation of a drill 52 in a patient's mouth, or to more effectively drill teeth at a desired angle.

The purpose of spring 37 is to allow either down or up movement of the drill connector piece F and hence the drill 52 itself. As shown in FIGURE 7 the spring 37 will allow the drill connector piece F to move downward a little. If the spring 37 is placed above the sleeve portion 49, the drill connector piece F may be moved upward a little. If no movement is desired, spring 37 may be dispensed with. It is to be noted that although it is not apparent to an observer, when drilling around teeth the dentist must always drill down and up because the gingival margin is higher interproximally and lower labially or lingually. Thus the inventor has provided a spring which will allow up or down movement depending on whether the spring is placed above or below the sleeve portion 49.

The purpose of ball bearings 50 is to allow the sleeve portion 49 to slide easily up and down without sticking as there is a tendency to stick if there were no ball bearings. However, the ball bearings may be eliminated in the interest of economy.

The clip portion 51 may be varied as to the shape, size, and number of clips utilized. The hand piece head of dental drills may be concentric, tapered, or have other shapes and may be of different sizes so that the clip portion 51 must be made so that it will hold the hand piece head of the particular dental drill owned by the user of the handpiece drilling guide. The clip portion 51 may be made of one or more clips, although it is shown in the drawings to be made of only one clip.

The preferred embodiment of the invention is at most one half inch in height. This height may be lessened without impairing the operation of the guide.

Although but a single embodiment of the invention has been disclosed and described herein, it is obvious that many changes may be made in the size, shape, arrangement, and detail of the various elements of the invention without departing from the scope of the novel concepts of the present invention.

I claim as my invention:

1. Apparatus for guiding a dental drill for drilling parallel cavities in teeth, comprising a base plate having a plane upper face, and a lower face adapted to be secured to a tooth, an arm comprising first and second levers hinged together intermediate the ends of said arm to permit pivotal movement of said levers relative to one another about the hinge axis, means connecting one end of said arm to said plate to permit rotation of said arm about said plate in a plane disposed substantially parallel to said upper face of said plate, and means on the opposite end of said arm for receiving and holding the head of a dental drill, said last-named means being movable relative to said arm in a plane extending normal to said first-named plane, and being pivotal relative to said arm about an axis extending normal to said first-named plane.

2. Apparatus as defined in claim 1 wherein said first-named means comprises a stationary member secured to said plate and having a segmental spherical recess in the face thereof confronting said first-named plane, a rod secured at one end to said one end of said arm and having a bulb-shaped configuration integral with the other end thereof, and means securing said bulb-shaped end of said rod in said recess for rotation about an axis extending substantially normal to said first-named plane, and for limited pivotal movement in planes extending normal to said first-named plane.

3. Apparatus for guiding a dental drill for drilling parallel cavities in teeth, comprising a base plate having a plane upper face, and a lower face adapted to be secured to a tooth, an arm comprising first and second levers hinged together intermediate the ends of said arm to permit pivotal movement of said levers relative to one another about the hinge axis, means rotatably connecting said arm at one end thereof to said base plate for rotation about an axis extending substantially normal to said upper face of said plate and parallel to said hinge axis, an angular shaft mounted on the opposite end of said arm for limited translational movement relative to said arm in a plane extending normal to said upper face of said plate, said shaft having at least one portion thereof extending normal to said upper face of said base plate, and a dental drill holding element mounted on said one portion of said shaft for movement axially thereof and for rotation thereabout.

4. Apparatus as defined in claim 3 wherein said means comprises first and second members which are secured together at one of their ends by a knuckle joint, and which at their opposite ends are secured to said base plate and said one end of said arm, respectively.

5. Apparatus for guiding a dental drill for drilling parallel cavities in teeth, comprising a base plate having a plane upper face, and a lower face adapted to be secured to a tooth, an arm comprising first and second levers hinged together intermediate the ends of said arm to permit pivotal movement of said levers relative to one another about the hinge axis, means rotatably connecting said arm at one end thereof to said base plate for rotation about an axis extending substantially normal to said upper face said base plate and parallel to said hinge axis, a spindle fixed at one end to the opposite end of said arm and projecting outwardly therefrom parallel to said hinge axis, an element mounted on said spindle for rotation thereabout and for limited axial movement relative thereto, an angular shaft having one portion thereof mounted on said element for translational movement therewith relative to said spindle, and having the remaining portion thereof laterally spaced from said element and extending parallel to said spindle, and a dental drill clamp member mounted on said remaining shaft portion for rotation thereabout and for movement axially thereof, and adapted to receive and hold the head of a dental drill.

6. Apparatus as defined in claim 5 wherein said element comprises a first tubular portion mounted on said spindle coaxially thereof for rotation thereabout and for limited sliding movement axially thereof, and a second tubular portion integral with said first tubular portion and having an axial center line intersecting the axial center line of said first tubular portion at an angle, said one portion of said angular shaft being rotatably mounted in said second tubular portion coaxially thereof, and detent means on said second tubular portion and said one portion of said angular shaft, respectively, cooperating to prevent rotation of said one shaft portion in said second tubular portion.

7. Apparatus for guiding a dental drill for drilling parallel cavities in teeth, comprising a base plate adapted to be secured by dental plaster to a tooth, said plate having a slot extending across the face thereof which is to be disposed remote from the cutting surface of said tooth, a slide block secured in said slot and having a segmental spherical recess in its face, a rod having a bulb-shaped lower end, dental drill holding and guide means connected to the upper end of said rod, and means securing said bulb-shaped end of said rod in said segmental spherical recess to permit limited universal movement of said rod and dental drill holding and guide means relative to said slide block and base plate.

8. Apparatus as defined in claim 7 wherein two skirt members depend downwardly from said base plate adjacent opposite sides thereof, respectively, to overlap the sides of the tooth to which said plate is secured, and wherein at least one of said members is hinged to said plate, each of said skirt members having a plurality of perforations therethrough into which part of said dental plaster is adapted to flow and set.

9. Apparatus as defined in claim 7 wherein said slide block has a bifurcated end, and a threaded stud is secured at one end to the bottom of said slot in said base plate and projects upwardly therefrom between the bifurcations in said block and has a nut threaded thereon for engaging and securing said block in said slot.

10. Apparatus as defined in claim 7 wherein the centerline of said slot is laterally offset from the center of said face of said plate.

References Cited in the file of this patent

UNITED STATES PATENTS

| | | |
|---|---|---|
| 2,434,320 | Karlstrom | Jan. 13, 1948 |
| 2,675,615 | Rosenberg | Apr. 20, 1954 |
| 2,698,998 | Checkik | Jan. 11, 1955 |